Patented July 27, 1937

2,088,458

UNITED STATES PATENT OFFICE 2,088,458

PREPARATION OF HIGH GRADE APPLE POMACE

George L. Baker, Newark, Del., assignor to the Public of the United States of America No Drawing. Application July 29, 1936, Serial No. 93,170

4 Claims. (Cl. 99—133)

This invention relates to the treatment and purification of pectin-containing materials previous to their drying for storage or to pectic extraction. The invention is particularly directed toward the removal of apple starch, sugar, salts, flavors and organic coloring matter from apple pomace whereby the pomace is of higher grade, light in color, and has approximately 75% of the weight and volume of untreated pomace. The invention is also directed to the facilitation of the drying operation and storage of the pomace. Furthermore, the treated pomace requires no leaching previous to extraction. In addition, the invention gives a pomace which under favorable extraction conditions gives 20 to 30% greater jelly unit yields of pectin than ordinary kiln-dried pomace. Pectic extracts from the pomace treated according to this invention will be practically free from starch, sugars, etc., which will result in greater clarity of the extract and greater ease in concentrating or drying the pectin. The usual enzymic hydrolysis of the starch present in the extract and a filtration operation may be omitted upon extracts from pomace treated according to this invention, thus saving in cost of preparing the pectin.

The usual method of treating apple pomace for pectic extraction is as follows: Pomace from which the cider has just been pressed is run through a pomace picker and then repressed in the hydraulic press to reduce moisture and constituents soluble in the juice. This repressed pomace is dried immediately, kiln-drying being the most desirable method.

Manufacture of pectin from this dried pomace has been complicated by leaching with running water as usual tap temperatures or by immersing the dried pomace in water, quickly bringing to a boil, and then draining or filtering off the leach water in order to remove more of the natural sugars, salts, and flavoring and coloring materials that were not removed at the time the cider was pressed before the pomace was dried. No pectin other than water soluble pectin is supposedly lost in these leaching operations. However, such processes are either long, as when leaching with tap water, or are only partly successful in removing apple starch which will be dispersed in the pectic liquor resulting from the acid extraction of the pomace.

It is the object of this invention, then, to provide a dry pectin-containing material substantially free of fruit starches, salts, sugars, coloring and flavoring materials. The primary object being to produce a pection bearing apple pomace practically free of apple starch and with a substantially higher jelly unit value.

Another object of this invention is to provide and disclose a method of removing fruit starches, salts, sugars, and coloring and flavoring materials from pomaces which will aid substantially in drying these pomaces without loss of jelly unit content (grade of pectin multiplied by percentage of pectin present, a measure of jellying powers).

A further object of this invention is to produce a pomace which when extracted by usual acid mediums will give extracts of greater clarity due to the substantial absence of contaminating starches, sugars, salts and organic coloring material and extracts which may be concentrated or dried with greater ease and rapidity due to the substantial absence of starch and sugars.

A still further object is to provide and disclose a method whereby the starch content of a freshly pressed pomace may be made hydrolyzable by diastatic enzyme bearing preparations in the preparation of a substantially starch-free pomace or pectin-containing material of high jelly unit value.

Other and further important objects of this invention will become apparent from the following description and appended claims.

This invention is based upon the discovery that starch particles present in freshly pressed pomace may be made hydrolyzable by heating a mixture of freshly pressed, ground pomace and water, without adjustment of acidity, to temperatures where the constituents such as the fruit sugars, salts, and organic coloring and flavoring materials are readily made soluble and the starch particles dispersed or made hydrolyzable by diastatic enzyme containing preparations. The temperature necessary to accomplish this purpose was readily noted by the following experiment: Fifty gram samples of freshly pressed Stayman apple pomace were covered with 300 grams of water and heated to various temperatures. The mixtures were held at these temperatures for 1 minute and then cooled to 87° F. as rapidly as possible. A representative diastatic enzyme preparation Clarase (0.1 gram) was added to each sample and the starch hydrolyzed to a light brown test with iodine solution. After determining the relative viscosity of a small filtered sample with the Ostwald viscosity pipet the pomace and extract were poured into double their volume of 90% ethyl alcohol. The alcohol and soluble constituents were filtered off through muslin, the pomace was pressed as dry as possible by hand and then dried in the oven at 177° F. for 20 hours. The dry samples were weighed and ground to pass a 1 mm. mesh screen. Pectin extractions were made on 5 gram portions of these dried samples in 195 cc. of water solution. The pH of each water solution was adjusted to 3.5 with N/1 HCl. A 10-minute extraction was made on each portion at boiling temperature. After the extraction, the weight was adjusted to 200 grams and 170 grams of extract was squeezed from each extraction. The extracts were clarified with the aid of filter-cel and relative viscosity measurements were made upon the clarified extracts before and after the hydrolysis of the starch. The jelly unit values (percentage of pectin yield multiplied by grade of the pectin) of the dried pomace and the fresh pomace were calculated from the relative viscosities of the clarified extracts by the formula, $$u = \frac{a}{b} \frac{(\log y - .2)}{d}$$

where $u$=jelly units, $a$=weight of extract expressed, $b$=weight of pomace extracted, $y$=relative viscosity of pectin extract, and $d$ is a constant which varies between 0.62 and 0.73 depending upon the starch dispersed in the extract. Comparative data was found as follows:—

| Temp. of heating | Viscosity of leach water | Alcohol insoluble precipitate | Pomace made soluble by heating | Viscosity of clarified extract | Viscosity of starch-free extract | Viscosity change after diastatic hydrolysis | Jelly units in dried pomace | Jelly units in 50 grams fresh pomace |
|---|---|---|---|---|---|---|---|---|
| °F. | 80° F. | Grams | Per-cent | 80° F. | 80° F. | Percent | | |
| 87 | 1.17 | 10.36 | 0 | 7.30 | 5.95 | 18.5 | 30.9 | 64.0 |
| 105 | 1.25 | 10.12 | 2.3 | 8.00 | 6.88 | 14.0 | 33.2 | 67.2 |
| 140 | 1.32 | 9.04 | 12.7 | 9.48 | 8.77 | 7.5 | 38.2 | 69.1 |
| 177 | 1.44 | 7.81 | 24.6 | 10.78 | 10.62 | 1.2 | 45.6 | 71.2 |
| 200 | 1.68 | 6.94 | 33.0 | 11.52 | 11.43 | 0.8 | 47.2 | 65.5 |

The following points may be noted from this data:—

1.—That the viscosity of the leach water increased more rapidly as the leaching temperature was raised above 177° F. showing the presence of more soluble pectin. 2.—That the percentage of viscosity change of the clarified extract before and after hydrolysis by the diastatic enzyme preparation was very low at 177° F. showing that the starch was substantially removed at this temperature. 3.—That a uniform increase in solubility of pomace was found above 105° F. which reached appreciable proportions above 140° F., showing that increased solubility of sugars, salts, etc., and tendency of starches to assume a condition, where hydrolysis by diastatic enzymes was facilitated, was accomplished at these higher leaching temperatures. 4.—That the leached and dried pomaces gave extracts with increasing viscosity as the temperature of leaching was raised showing an increased pectic value of the dried pomace, the rate of increased pectic value was less above 177° F. 5.—That the calculated jelly units present in the dried pomace increase more rapidly between leaching temperatures of 140° F. and 177° F. than between other temperatures of measurement and that the rate of increase above 177° F. was much slower showing that the improvement in jelly unit value of the pomace leached above 177° F. was of no material value. 6.—That, when the jelly units were calculated on the basis of the fresh pomace, the greatest yield appeared on the basis of a pomace leached at 177° F., at higher leaching temperature such as 200° F. greater hydrolysis of pectic material evidently took place as shown by the decreased rate of viscosity rise in the clarified extract, at lower temperatures the contamination by increased starch content was increasingly greater.

It was considered probable that on low starch containing pomaces a lower leaching temperature than 177° F., even one down to 140° F., might be satisfactory to make the starch present hydrolyzable. It was also considered probable that temperatures up to boiling would satisfactorily accomplish the desired leaching and treatment to make the starch hydrolyzable by the various diastatic enzyme preparations. In the range of temperature between 140° F. and 200° F., 177° F. appeared the preferred temperature to satisfactorily accomplish my purpose.

The natural hydrogen ion concentration attained by the pressed pomace and leach water has been found satisfactory for the leaching and diastatic enzyme treatment processes. No economic advantage was found by experimentally buffering to a higher pH value where the hydrolysis of pure starch dispersions would be more rapid.

The time of applying the leaching process to fresh pomace should be as short as possible, approximately one minute at the desired temperature is preferred. It is recognized that certain advantages may be obtained by applying this process to dried apple pomaces in order to remove starch and soluble constituents previous to the extraction of the pectin present. To accomplish results similar to those attained upon ground fresh pomace, I have found that the time of leaching dried pomace at the desired temperature should be extended approximately five times as long on account of the increased hardness of cellular material appearing in the dried pomace.

The method of this invention when applied to fresh apple pomace is essentially as follows:—

The freshly pressed pomace is ground to a uniform particle size; water is added sufficient to allow agitation of the water and pomace in a tank equipped with agitator and means for heating; the temperature of the pomace-water mixture (while agitating) is raised preferably to 177° F. and held for 1 minute; the mixture is then cooled to approximately 90° F. or the hot water is drained out and fresh water added to adjust the temperature to approximately 90° F.; any suitable diastatic enzyme preparation is added in a quantity sufficient to hydrolyze the apple starch to a brown test with iodine solution in from 15 to 20 minutes; the water, containing soluble sugars, etc., is pressed out and the pomace dried immediately (an alcohol leach at room temperature, 80° F., after the water is pressed out is a preferential aid to drying procedure).

Pectin may be extracted by any well known procedure (such as the procedure developed at the Delaware Agricultural Experiment Station and disclosed by the patent to Philip B. Myers and George L. Baker, No. 1,892,536, issued December 27, 1932) from the above treated pomace either immediately after pressing out the water containing the soluble sugars, etc., or after the pomace has been dried. It will be found that the pectin extracts from this pomace will have a much lower degree of turbidity and will contain a greater number of jelly units than pectic extracts from pomace treated according to usual procedure.

A specific example of the pomace treatment and effect upon clarity and starch content of an extraction therefrom in comparison with an extraction from ordinary alcohol treated pomace is made in the following:—

A 1000 gram sample of freshly pressed and ground Stayman apple pomace was covered with 6 liters of boiling water and then heated to 200° F. while agitating and held at this temperature for 1 minute. The hot leachate was pressed through muslin and cold water was added to return the weight to 7000 grams. The temperature was adjusted to 90° F. and 0.1 gram of Clarase (a product of Takamine Laboratory, Inc.) hydrolyzed the remaining apple starch in 20 minutes to a brown starch-iodine test. The water was pressed out and the pomace covered with 1 liter of 90% ethyl alcohol. A 1000 gram control sample of the same pomace was covered with 1 liter of 90% alcohol also. The alcohol was pressed from these pomaces and the samples were dried at 160° F. and ground to pass a 1 mm. screen. The control sample yielded 167 grams of dried pomace and the leached sample 135 grams, or 19% of the material present in the control was made soluble and removed by the leaching and diastatic hydrolysis.

Optimum conditions for extracting pectin from 5 gram samples of both of these pomaces, treated and untreated, were 10 minutes of boiling in 195 grams of water, the mixture being adjusted to pH 2.5 with HCl. Extractions were made upon both pomaces according to these conditions and the extracts were clarified with standard super-cel filter aid. Comparative data follows:—

|  | Treated pomace | Control |
| --- | --- | --- |
| Relative viscosity of extract at 80° F. (Ostwald) | 16.30 | 14.97 |
| Turbidity, photoelectric colorimeter, microamp | 34.3 | 18.0 |
| Turbidity, percent | 6.0 | 22.5 |
| Pectin, present in extract solution, percent | 0.411 | 0.338 |
| Starch, present in extract solution, percent | 0.006 | 0.248 |
| Starch, present as alcoholic prec. material, percent | 1.4 | 42.3 |
| Sugar supported by 1 gram extract | 1.60 | 1.28 |
| Jelly units in dried pomace | 54.4 | 46.5 |
| Jelly units in fresh pomace | 7.3 | 7.2 |

It was found that fairly drastic leaching and diastatic enzyme treatment could be applied to a freshly pressed pomace without loss in jelly unit value. The leached and dried pomaces were found to have about 20% greater pectic value than ordinary pomaces. The extracts from the leached pomaces were only from ¼ to ½ as turbid as extracts from ordinary dried pomaces. The starch present in extracts from leached pomaces was only a fraction of that present in unleached pomaces. The pectin may be extracted as a much more concentrated solution from the leached pomaces and there was experimental indication that the extraction of pectin was facilitated by the leaching and diastatic treatment.

It will be apparent to those skilled in the art that numerous changes may be made in the hot leaching process or in the method of hydrolyzing the apple starch. The low temperature used in connection with diastatic hydrolysis is in agreement with results of a recent study at the Delaware Agricultural Experiment Station, higher temperatures may be used but are apt to prove injurious to pectins. The proportion of water to be used in leaching may obviously be varied. The amounts of enzyme required depend upon the diastatic strength of the enzyme preparation and the starch content of the pectin-containing material and may be determined by chemical means. The koji, from which takadiastase is extracted, has been found entirely satisfactory for the starch hydrolysis reaction. It is also obvious that the hot water leaching may be used with beneficial results in the removal of fruit sugars, salts, etc., from pectic-bearing materials not essentially starch containing. These methods and modifications of the invention are limited only by the scope of the appended claims.

I claim:

1. The process for the treatment and removal of starches, sugars, salts and coloring and flavoring substances from pressed juice-free, starchy pectin-containing material which comprises the heating of a mixture of water and said pectin-containing material to temperatures of 140° F. to 200° F., cooling to 90° F., adding a diastatic enzyme to hydrolyze starch particles and separating the water and substances soluble therein from the pectin-containing material.

2. The process for the treatment and removal of starches, sugars, salts, and coloring and flavoring substances from pressed juice-free, starchy pectin-containing material which comprises the heating of a mixture of water and said pectin-containing material to temperatures of 140° F. to 200° F., separating the water and substances soluble therein from the pectin-containing material, adding water to replace that separated and adjusting temperature to 90° F., adding a diastatic enzyme preparation to hydrolyze starch particles and then separating the water and substances soluble therein from the pectin-containing material.

3. The process for the treatment and removal of starches, sugars, salts, and coloring and flavoring substances from pressed juice-free, starchy pectin-containing material which comprises the heating of a mixture of water and said pectin-containing material to temperatures of 140° F. to 200° F., separating the water and substances soluble therein from the pectin-containing material, adding water to replace that separated and adjusting the temperature to a point favorable for the hydrolysis of the starch present by diastatic enzyme, adding a diastatic enzyme preparation to hydrolyze starch particles and then separating the water and substances soluble therein from the pectin-containing material.

4. The process for the treatment and removal of starches, sugars, salts, and coloring and flavoring substances from pressed juice-free, starchy pectin-containing material which comprises the addition of hot water to said pectin-containing material while agitating, adjusting the temperature of the mixture to temperatures of 140° F. to 200° F., separating the water and substances soluble therein from the pectin-containing material, adding water to replace that separated and adjusting the temperature to a point favorable for the hydrolysis of the starch present by diastatic enzyme, adding a diastatic enzyme preparation to hydrolyze starch particles and then separating the water and substances soluble therein from the pectin-containing material.

GEORGE L. BAKER.